United States Patent [19]

Sawyer

[11] 3,769,069

[45] Oct. 30, 1973

[54] POLYESTERURETHANE COATED METAL

[75] Inventor: John M. Sawyer, Cuyahoga Falls, Ohio

[73] Assignee: The Goodyear Tire & Rubber Company, Akron, Ohio

[22] Filed: Mar. 16, 1971

[21] Appl. No.: 124,923

[52] U.S. Cl................ 117/75, 117/49, 117/71 M, 117/97, 117/132 BE, 260/37 EP
[51] Int. Cl............................................. B32b 15/08
[58] Field of Search.......... 117/75, 132 BE, 161 KP, 117/71 M; 260/37 EP

[56] References Cited
UNITED STATES PATENTS

| | | | |
|---|---|---|---|
| 3,377,193 | 4/1968 | Stilmar | 117/75 |
| 3,352,955 | 11/1967 | Pigott et al. | 117/161 KP X |
| 3,042,545 | 7/1962 | Kienle et al. | 117/75 |
| 3,353,979 | 11/1967 | Hunn | 260/37 EP X |
| 3,447,949 | 6/1969 | Singer | 117/75 |
| 3,552,703 | 1/1971 | Ronellenfitch | 117/75 X |
| 3,030,249 | 4/1962 | Schollenberger et al. | 117/75 X |

*Primary Examiner*—Ralph Husack
*Attorney*—F. W. Brunner and J. D. Wolfe

[57] ABSTRACT

A metal laminate comprising a metal having a primer coat of zinc chromate, epoxy resin and a curative covered with a polyesterurethane elastomer.

3 Claims, No Drawings

POLYESTERURETHANE COATED METAL

This invention relates to a method of protecting metals and to the resulting composite. More particularly, this invention relates to a method of protecting metal of containers such as railroad hopper cars, truck bodies, etc. from abrasion and acid corrosion due to the effects of moisture on the products coming in contact with the metal or being stored in the metal container or tank.

Difficulty has been experienced for a number of years in hauling salt and related corrosive materials with these corrosive materials abrading and corroding the metal with which the container was constructed. Also, these highly abrasive materials tend to tear away the coating and thus lead to pinholes that appreciably corrode and ultimately cause failure of the metal beneath.

The object of this invention is to provide a method for protecting metals which are used for handling abrasive and corrosive materials such as salt and related materials.

The objects of this invention are accomplished by cleaning the metal and then applying a coating of about 1 to 5 mils of a primer of the type hereinafter described and then applying over the primer coat an elastomeric polyesterurethane of the polyester type and curing the resulting elastomeric polyurethane coating. The metal, such as iron or steel, is preferably cleaned by sandblasting or shot blasting, although alternatively it may be cleaned by acid washing or other well-known means in the trade. To the clean metal surface there is applied a solvent coating about 1 to 5 mils thick of a suitable primer, the preferred primer being zinc chromate dispersed in an epoxy primer. Where the epoxy primer is a solution of a suitable epoxy resin with a curative such as an amide in a suitable solvent such as those that boil below about 350°F., preferably the primer contains from about 90 to 30 percent solvent with the rest being essentially zinc chromate, epoxy resin and a curative for the epoxy resin. The primer may be applied to the clean metal by brushing or preferably by spraying, using either an air or airless type spray gun. Preferably the primer is applied at a temperature above 65°F. and the relative humidity is less than about 80 percent to obtain the best adhesion of the primer coat to the clean metal surface. Over the primer coat there is applied a coating of about 10 to 35 mils thickness of an elastomeric polyesterurethane. The elastomeric polyesterurethane is preferably applied as a reaction mixture which reacts and cures to give a satisfactory bond to the metal through the primer coat and a tough coating resistant to the abrasive action of the salt, coal or other material being handled.

The polyesterurethane used is preferably the reaction product of about 1.5 to 2.6 mols of toluene diisocyanate or methylene di(phenylisocyanate), sometimes called MOI with each mol of polyester polyol of about 500 to 5000 molecular weight, with the preferred molecular weight being about 1000 to 3000.

Representative of the polyester polyols are those produced by condensation of a polyol such as ethylene glycol or its homologues, such as propyleneglycol or butylene glycol up to about 10 carbon atoms with the polycarboxylic acids or their anhydrides. The polycarboxylic acids are represented by the aromatic, aliphatic and alicyclic types.

Representative members of the aromatic polycarboxylic acids acids are phthalic, isopthalic and terephthalic acids. The aliphatic acids are represented by the dicarboxylic acids containing 2 to 12 carbon atoms, for example, adipic acid and azelaic acid.

Although any of the normal polyols or polyamine type curatives may be used, the preferred curatives are methylene dianiline and/or methylene diorthochloroaniline, otherwise called MOCA. In general, any of the diamines may be used which with toluene diisocyanate or MDI do not yield a turbidity within 30 seconds after the isocyanate and diamines dispersed in a boiling tenth normal solution of methylene chloride are mixed. Preferably the curative is used about 0.5 to .95 mol for each mol of excess isocyanate relative to the polyol.

The nature of this invention may be more fully understood by reference to the following representative examples wherein all parts are by weight unless otherwise indicated.

EXAMPLE

A steel railroad hopper car suitable for handling salt was sandblasted to remove any scale on the steel and then cleaned to give a surface suitable for application of the primer coat. Pigment grade zinc chromate was blended in a suitable vehicle consisting of a methyl ethyl ketone solution (MEK) of an epoxy resin and a polyamide curing agent containing a small amount of iron oxide to designate the curative component to give the primer. The primer then has mixed in about one part of zinc dust for each part of primer. Then the primer is screened through a 30–50 mesh U.S. standard screen to remove any lumps. If the primer with zinc dust is too thick, it is diluted with more MEK to give a viscosity of approximately 70 to 75 Krebs units at 75°F. that can readily be sprayed onto the metal surface to give a primer coat of about 2.5 to 3 mils when all the solvent was removed. The temperature of the metal at the time the primer was sprayed thereon was approximately 75°F.

A prepolymer was made by reacting 1 mol of a 2000 molecular weight 80/20 polyethylene propylene adipate with 2 mols of an 80/20 isomeric mixture of 2,4 to 2,6 toluene diisocyanates. This prepolymer was dissolved in toluene and then a MOCA solution in methyl ethyl ketone was added to the prepolymer and sprayed over the primer coat to give a coating of 15 to 16 mils when the solvent was evaporated to give an elastomeric polyurethane coating over the metal. This polyesterurethane coated metal was subjected to salt hauling conditions. Under these salt hauling conditions this coating has withstood the erosion and corrosion normally experienced. Furthermore, the salt does not tend to stick to the sides of the container. Thus, a metal hopper car treated in this manner is more readily emptied and cleaned of salt than an untreated car. Also, it should be emphasized that after several months of this hauling condition the coating is free of any signs of deterioration.

Idler rolls in the conveyor system used to handle salt in or out of the mines may be treated with the zinc chromate enriched with zinc dust primer coat and the polyurethanes to give an idler roller that will be more satisfactory in this service.

Representative of the epoxy resins useful in this invention are those commercially available and described chemically in U.S. Pat. No. 3,350,406.

The curative for the epoxy resins useful in this invention are of three primary groups, i.e. the amines, the acids and the polyamides. Representative examples are the epoxy bis phenols and the polyamides.

Although it is preferred to apply the polyurethane as a mixture of the prepolymer and curative, the one-shot system or others can be used except that coat build-up will be slower. It is desirable generally to use a small amount of Cab-O-Sil and related pyrogenic silica, usually in amounts of about 5 to 20 parts per 100 parts of the polyurethane mixture, to reduce flow or sagging of the coat and to permit thicker coats to be laid down.

In the example, methyl ethyl ketone has been illustrated as the solvent. It should be appreciated that any of the well-known paint solvents can also be used.

Where the metal is to be used to store salt, a preferred practice is to use an enriched zinc chromate primer. The enriched zinc chromate primer is made by blending 5 to 30 percent of powdered zinc into the primer and then applying the enriched primer in the usual way by painting or spraying. The enriched primer prevents undercutting and in general gives a better result with salt.

While certain representative embodiments and details have been shown for the purpose of illustrating the invention, it will be apparent to those skilled in this art that various changes and modifications may be made therein without departing from the spirit or scope of the invention.

What is claimed is:

1. A coated metal consisting essentially of a metal having a primer coat consisting essentially of a mixture of zinc chromate, epoxy resin and a curative for the epoxy resin, said primer coat being dry residue of a primer consisting essentially of zinc chromate admixed with sufficient epoxy resin and solvent to give a viscosity of approximately 70 to 75 Kreb units at 75°F., said solvent being present in about 30 to 90 percent by weight, and a coating of an elastomeric polyesterurethane over the primer coat, said polyurethane being the reaction product of a mixture of one mol of a polyester polyol of 500 to 5000 molecular weight, with 1.5 to 2.5 mols of an organic polyisocyanate of either toluene diisocyanate or methylene di(phenylisocyanate) and an organic diamine which does not exhibit a turbidity within 30 seconds when a tenth normal solution thereof in boiling methylene chloride is mixed with toluene diisocyanate.

2. The coated metal of claim 1 wherein the primer coat contains 5 to 30 percent by weight of powdered zinc on the primer weight.

3. The coated metal of claim 1 wherein the primer coat is obtained by applying an enriched primer containing 5 to 30 percent by weight of powdered zinc on the primer weight and the primer passes through a 30–50 mesh U.S. Standard Screen.

* * * * *